Sept. 28, 1937.  E. H. WILLETTS  2,094,336
TANK VEHICLE
Filed May 9, 1935   3 Sheets-Sheet 1
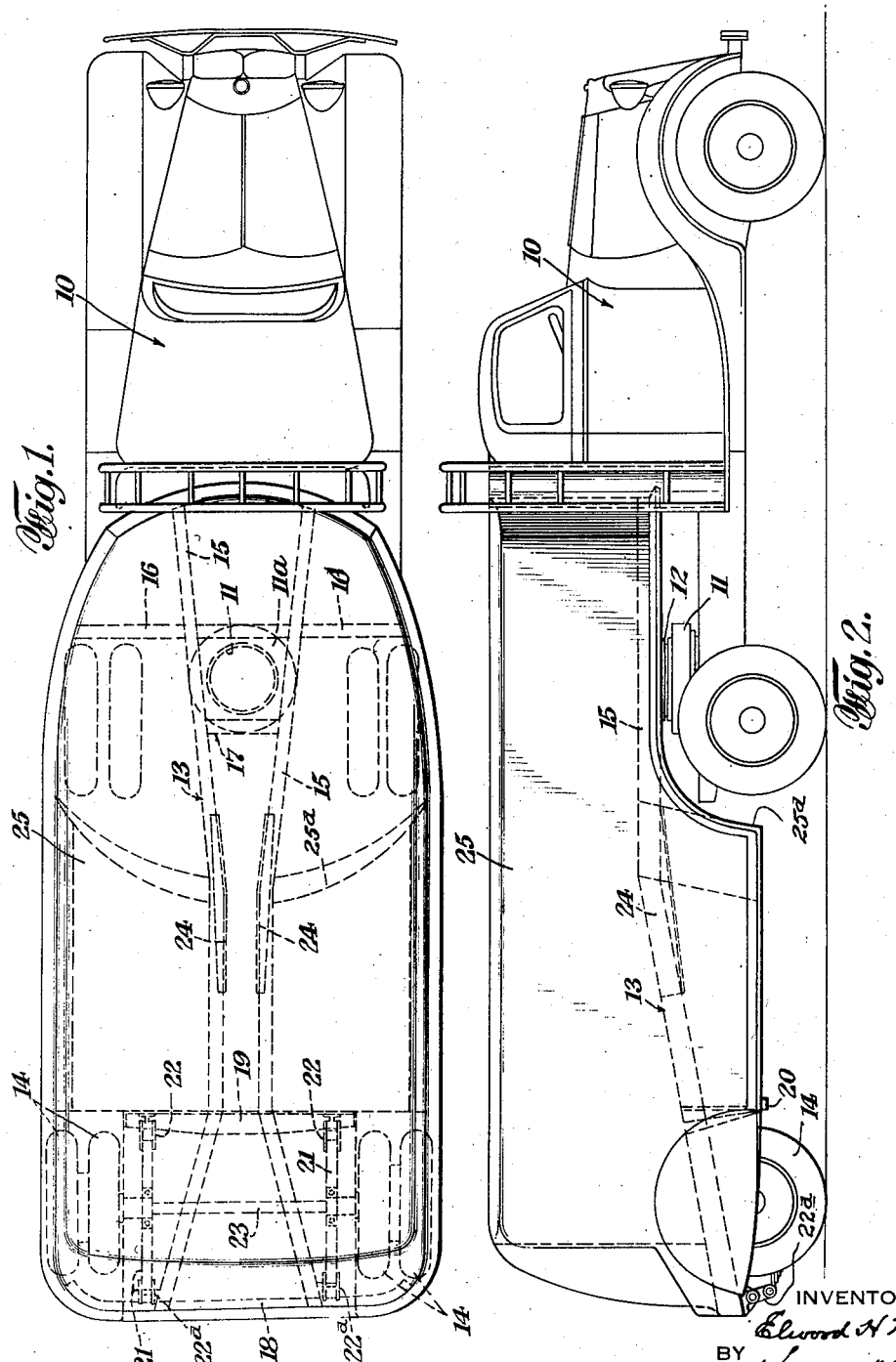
INVENTOR
Elwood H Willetts
BY Kenyon & Kenyon
ATTORNEYS.

Sept. 28, 1937.  E. H. WILLETTS  2,094,336
TANK VEHICLE
Filed May 9, 1935    3 Sheets-Sheet 2
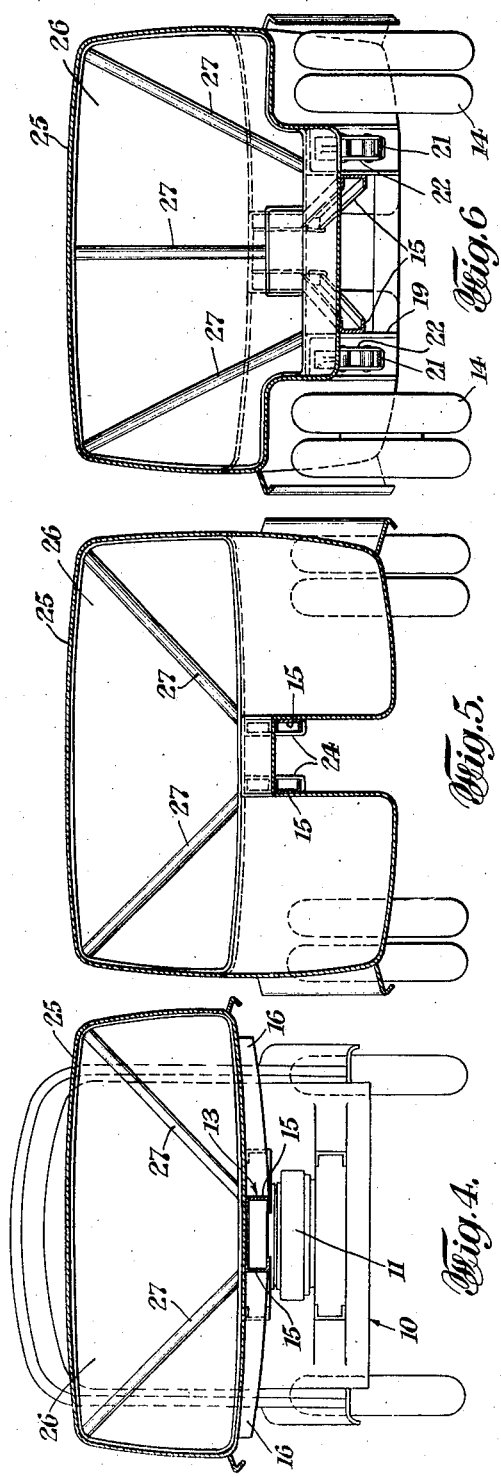
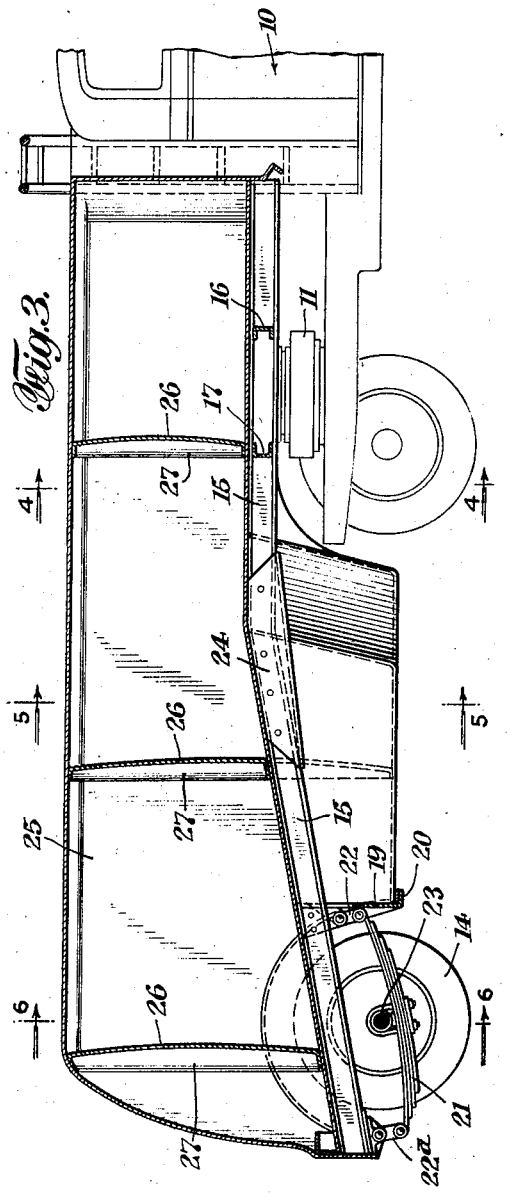
INVENTOR
Elwood H. Willetts
BY Kenyon & Kenyon
ATTORNEYS Sept. 28, 1937.  E. H. WILLETTS  2,094,336
TANK VEHICLE
Filed May 9, 1935  3 Sheets-Sheet 3
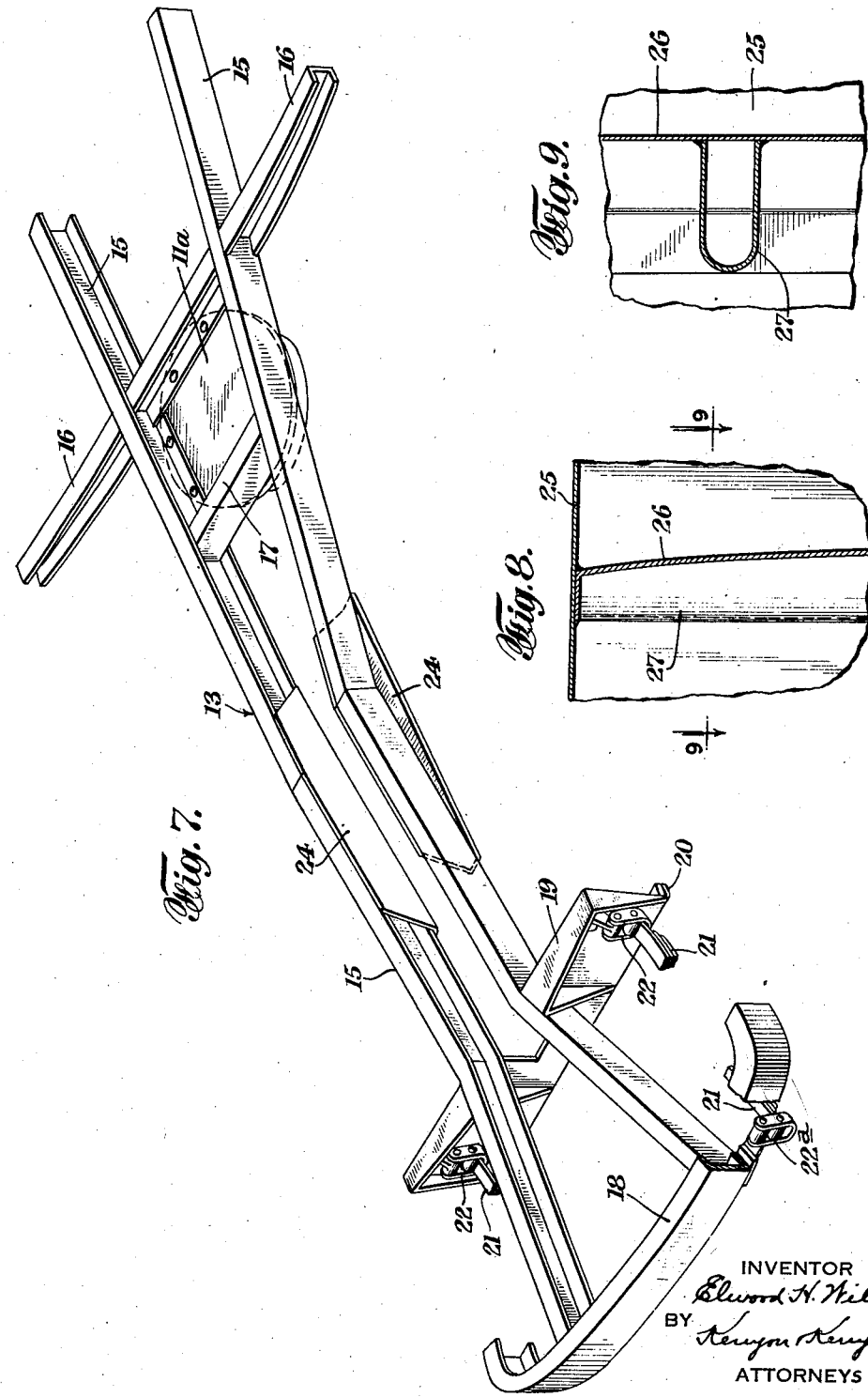

Patented Sept. 28, 1937

2,094,336

UNITED STATES PATENT OFFICE 2,094,336

TANK VEHICLE

Elwood H. Willetts, Jackson Heights, N. Y.

Application May 9, 1935, Serial No. 20,591

13 Claims. (Cl. 280—5)

This invention relates to tank vehicles and more especially to tank vehicles of the semi-trailer and truck type.

An object of this invention is a tank vehicle having a greater capacity than heretofore for a given overall length, width and height of the vehicle and one which is less expensive, lighter and of lower operating cost than previous vehicles of the same class.

A vehicle embodying the invention has a longitudinal frame upon which a tank is directly supported. The tank depends for a portion of its length below the frame and is provided with bulkheads which are reinforced by struts extending from the frame to the tank shell at such points as to maintain the shell under vertical tension. The struts prevent buckling of the bulkheads and also obviate the necessity of the sills and transoms previously used in mounting a tank upon a vehicle. By having a portion of the tank depending below the frame, the space between the wheels is utilized to increase the tank capacity for a given overall length and height. Such an arrangement effects a reduction in the cost, weight and length of a vehicle required for a tank of a given capacity and also reduces the per gallon per mile operating cost.

Other objects, novel features and advantages of this invention will become apparent from the following specification and accompanying drawings, wherein:

Fig. 1 is a plan view of a vehicle embodying the invention;

Fig. 2 is a side elevation thereof;

Fig. 3 is a longitudinal section therethrough;

Figs. 4, 5, and 6 are sections on the lines 4—4, 5—5, and 6—6 respectively of Fig. 3;

Fig. 7 is a perspective view of the vehicle frame;

Fig. 8 is an enlarged fragmentary section through a bulkhead and

Fig. 9 is a section on the line 9—9 of Fig. 8.

A tractor 10 of any suitable type is provided with a fifth wheel 11 of conventional construction. By means of a conventional rocking upper fifth wheel 12, a frame 13 is pivotally connected at its front end to the tractor fifth wheel 11 and is provided at its rear end with supporting wheels 14. The frame 13 consists of a pair of channel beams 15, the front part of each beam being horizontal and the rear part sloping downwardly. Front outriggers 16 extend outwardly from the horizontal portions of the beams 15 and are spaced from the ends of said beams. The cross members 17 extend between the beams 15 and form a support for the upper fifth wheel 12 having a kingpin (not shown). The horizontal portions of the beams 15 converge rearwardly to the point where the sloping rear portions begin. The beams then continue parallel for a way, after which they diverge rearwardly, the rear ends being connected by the rear bumper 18. At the point on the beams where they begin to diverge rearwardly there is attached a cross frame member 19 which is provided at its bottom edge with a forwardly projecting horizontal flange 20. Springs 21 have their ends attached by shackles 22 to the cross frame member 19 and by shackles 22a to the bumper 18. Springs 21 are suspended in the usual manner from an axle 23 which is supported by wheels 14. Reinforcing plates 24 are attached to the beams 15 at the point at which the horizontal rearwardly converting portions end and the slanting parallel portions begin.

A tank 25 is supported by the frame 13 and consists of a front section having its bottom resting on the horizontal portions of the beams 15 and on the cross members 17 and outriggers 16 and an intermediate section which straddles the frame 15 and has depending portions arranged on either side of the frame, and a rear section resting on the slanting rear portions of the beams 15. The bottom of the front section lies above the level of the tops of the tractor wheels while the bottom of the intermediate section lies at about the level of the axles of the wheels 14 and the rear tractor wheels. The front wall 25a of the depending portion of the intermediate section is curved along an arc having the king bolt as its center, this giving maximum capacity to the tank and a greater percentage of load weight on the tractor king pin without locating the trailer axle so far rearward as in known practice. This also allows a proper clearance for the wheels of the tractor. The rear end of the bottom of the intermediate section rests on and is supported by the lip 20.

The tank is divided into compartments by bulkheads 26 and struts 27 are provided for each bulkhead, each strut running from an upper outer corner of the tank to a position of support by the frame 15. Each of these struts is U-shaped in cross-section and is straight along the bow of the U, but is curved along its edges to conform to the curvature of the bulkhead. The bulkhead struts reinforce the bulkheads sufficiently to prevent buckling thereof when one compartment is full with the adjacent compartment empty and also support the tank load from the frame so as to avoid the necessity of the sills and transoms customarily now used to support the tank above the frame, thereby saving weight and cost. The struts extend from the frame to a point in the tank shell such that the shell is under vertical tension and the tank load is transmitted directly to the frame.

Pipes for discharging the various compartments may extend therefrom to the rear end of the vehicle. These pipes may be supported in any suitable manner from the frame 15 and may be arranged in the space directly between or below the frame members 15. Any arrangement of pipes suitable for discharging purposes may be used. In the structure previously described, the tank shell is utilized for the transference of load stress to the supporting frame without the use of the customary transom or cross-members, the load stress being transferred from the top and side sheets of the shell which are in tension, through the diagonal struts to the frame. It has been common practice to use double bulkheads because of breakage occurring from inadequate stiffening means to prevent reversing or buckling of the bulkheads under load pressure. The use of struts welded directly to a single bulkhead not only prevents buckling or reversing of the bulkhead when compartments are loaded, thereby preventing loss from spillage when an adjacent compartment is loaded and the bulkhead returned to normal position, but also has the advantage of putting the tank shell in tension to transmit the load stress from the outer top corner of the shell through the diagonal struts to the frame. The elimination of the customary transoms and cross-members with their attendant tie straps and sills effects lowering of the center of gravity and the saving of valuable weight which is available for pay load.

I claim:

1. A tank vehicle comprising a longitudinal central frame having a horizontal front portion and a sloping rear portion, supporting wheels for said frame, and a tank supported by said frame, the front portion of said tank having its bottom flush with the horizontal portion of the frame, its intermediate portion having sections depending on either side of the sloping portion and a rear portion having its bottom flush with the sloping portion of the frame.

2. A tank semi-trailer comprising a longitudinal central frame, wheels supporting the rear end of said frame, means adjacent the front end of said frame for attaching the same to a tractor, said frame having a horizontal front portion and a sloping rear portion, and a tank supported by said frame, the front portion of said tank having its bottom flush with the horizontal portion of said frame, the intermediate portion of said tank having sections depending below the sloping portion of said frame on either side thereof and the rear portion of said tank having its bottom flush with the sloping portion of said frame.

3. A tank vehicle comprising a longitudinal central frame, supporting wheels therefor, and a tank supported by said frame, said frame being completely exterior of said tank and the front portion of said tank having its bottom flush with the frame, the intermediate portion having sections depending below said frame on either side thereof and the rear portion having its bottom flush with the rear portion of the frame, and a cross beam supported by the rear portion of the frame and having a forwardly extending flange underlying the rear end of the bottom of the intermediate portion of said tank.

4. A tank vehicle according to claim 1, wherein a cross beam is supported by the rear portion of the frame and has a forwardly extending flange underlying the rear end of the bottom of the intermediate portion of said tank.

5. A tank semi-trailer comprising a longitudinal central frame, wheels supporting the rear end of said frame, means adjacent the front end of said frame for attaching the same to a tractor, a tank supported by said frame, said frame being completely exterior of said tank and the front portion of said tank having its bottom flush with said frame, the intermediate portion of said tank having sections depending below said frame on either side thereof and the rear portion of its tank having its bottom portion flush with the rear portion of said frame, a cross beam supported by the rear portion of the frame and a forwardly extending flange on said cross beam underlying the rear end of the bottom of the intermediate portion of said tank.

6. A tank semi-trailer according to claim 2, wherein a cross beam is supported by the rear portion of the frame and has a forwardly extending flange underlying the rear end of the bottom of the intermediate portion of said tank.

7. A tank vehicle which comprises a central frame, supporting means therefor, said central frame being composed of two beams having front horizontal portions converging rearwardly and rear sloping portions parallel for a way and then diverging rearwardly, a tank supported by said frame, the front portion of said tank having its bottom flush with the horizontal portions of said beams, the intermediate portion having sections depending below said beams exterior thereof and the rear portion of said tank having its bottom flush with the sloping portions of said beam, and a cross member attached to the sloping portions of said beams, said cross member having a forwardly projecting flange underlying the rear end of the bottom of the intermediate portion of said tank.

8. A tank semi-trailer comprising a longitudinal central frame, wheels supporting the rear end of said frame, means adjacent the end of said frame for attaching the same to a tractor, said frame being composed of two beams having front horizontal portions converging rearwardly and rear sloping portions parallel for a way and then diverging rearwardly, a tank supported by said frame, the front portion of said tank having its bottom flush with the horizontal portions of said beams, the intermediate portion having sections depending below said beams exterior thereof and the rear portion of said tank having its bottom flush with the sloping portions of said beam, and a cross member attached to the sloping portions of said beams, said cross member having a forwardly projecting flange underlying the rear end of the bottom of the intermediate portion of said tank.

9. A tank semi-trailer comprising a longitudinal central frame, wheels supporting the rear end of said frame, means adjacent the front end of said frame for attaching the same to a tractor, and a tank supported by said frame, said frame being completely exterior of said tank and said tank being of substantially uniform width between said attaching means and said wheels, with sections depending below said frame on either side thereof intermediate said attaching means and said wheels.

10. A tank vehicle comprising a longitudinal central frame having a horizontal front portion and a sloping rear portion, supporting wheels for said frame, a tank supported by said frame, the front portion of said tank having its bottom flush with the horizontal portion of the frame, its intermediate portion having sections depending on either side of the sloping portion and a rear portion having its bottom flush with the sloping portion of the frame, bulkheads in said tank, and struts reinforcing said bulkheads, said struts being arranged with respect to the frame to transmit load stress thereto.

11. A tank semi-trailer comprising a longitudinal central frame, wheels supporting the rear end of said frame, means adjacent the front end of said frame for attaching the same to a tractor, a tank supported by said frame, said frame having a horizontal front portion and a sloping rear portion, the front portion of said tank having its bottom flush with the horizontal portion of said frame, the intermediate portion of said tank having sections depending below said frame on either side thereof and the rear portion of said tank having its bottom flush with the rear portion of said frame, bulkheads in said tank, and struts reinforcing said bulkheads, said struts being arranged with respect to the frame to transmit load stress thereto.

12. A tank vehicle according to claim 10 wherein a cross beam is supported by said frame and has a horizontal flange underlying the bottom of the intermediate portion.

13. A tank semi-trailer according to claim 11 wherein a cross beam is supported by said frame and has a horizontal flange underlying the bottom of the intermediate portion of said tank.

ELWOOD H. WILLETTS.